United States Patent [19]
Rogers et al.

[11] Patent Number: 5,665,417
[45] Date of Patent: Sep. 9, 1997

[54] HIGH DENSITY ANIMAL FEED BALES

[75] Inventors: Galan M. Rogers, Burley; Kenneth L. Schmidt, Rupert, both of Id.

[73] Assignee: The Amalgamated Sugar Company, LLC., Ogden, Utah

[21] Appl. No.: 580,309

[22] Filed: Dec. 28, 1995

[51] Int. Cl.⁶ ......................................... A23K 1/00
[52] U.S. Cl. ......................... 426/636; 426/658; 426/807
[58] Field of Search ............................ 426/635, 636, 426/658, 807; 100/3, 295

[56] References Cited

U.S. PATENT DOCUMENTS

| | | | |
|---|---|---|---|
| 2,707,151 | 4/1955 | Martin | 426/658 |
| 3,246,336 | 4/1966 | Baribo et al. | 425/658 |
| 3,991,670 | 11/1976 | Stromberg | 100/295 |
| 4,012,535 | 3/1977 | Fiala et al. | 426/636 |
| 4,034,117 | 7/1977 | Glabe | 426/636 |
| 4,098,180 | 7/1978 | Tea et al. | 100/295 |
| 4,676,153 | 6/1987 | Ast | 100/3 |

*Primary Examiner*—George Yeung
*Attorney, Agent, or Firm*—Trask, Britt & Rossa

[57] ABSTRACT

The present invention provides a high density bale of shredded pulp. The bale contains pulp and additive which are compressed while dry to obtain a bale of 40–65 lb/ft³ density. Twine or straps secure the bale. Animal feed bales of this invention contain low additive concentrations and low or no sugar content.

19 Claims, 1 Drawing Sheet

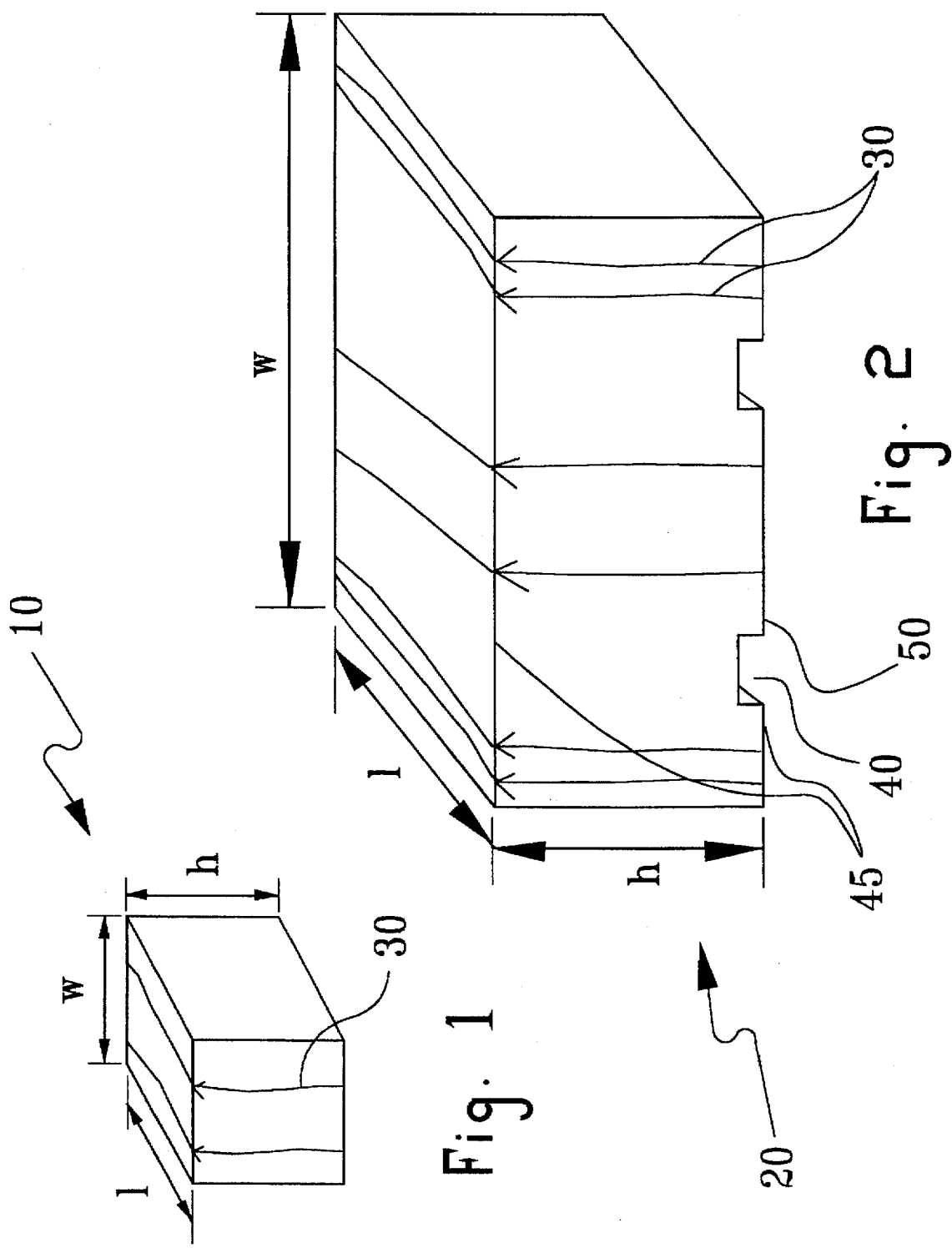

HIGH DENSITY ANIMAL FEED BALES

BACKGROUND OF THE INVENTION

1. Field

This invention relates to high density pulp bales. In particular, it is directed to pulp bales for use in animal feeds.

2. State of the Art

Many agricultural manufacturing processes produce fibrous cellulosic pulps as a by-product. These by-product pulps constitute a useful source of fibrous material in producing secondary products, notably animal feeds. These pulps characteristically dry as a small-sized, loose, fluffy, electrostatic-prone shredded material. Shredded material must be protected from air currents, such as winds, during storage and transport. Specialized high sided tracks are required for localized transport of loose shred material. Loose shred typically has a density of about 17–25 lb/ft$^3$.

The sugar industry mixes pulp by-product with a molasses by-product to obtain a more manageable dried pulp product. The dried molasses-coated pulp may be used as is, but it is more commonly compacted into pellets to facilitate its shipping and handling. Pellets typically have a density of about 40–42 lb/ft$^3$. The pellets are either bagged for shipping, or shipped by specialized hopper truck. They must be protected from precipitation, and are thus not generally stored out of doors. Specialized hopper tracks are required for local transport of these materials.

Lengthy fibers, such as hay or alfalfa, are routinely packaged in bales for storage and transport. U.S. Pat. Nos. 3,991,670 and 4,098,180 disclose procedures for forming bales of cellulose materials, for example.

Compacted mixed by-product animal feeds and feed components are conventionally produced as pellets or blocks by means of a wet compaction method. Bales and compacted blocks are superior to pellets or loose feeds in terms of time, economy, and ease of handling and storage. Bales and blocks may be stored outside, unprotected, without loss due to wind or moisture and may be shipped without the use of specialized trucks.

Typical feeds and feed manufacturing methods are disclosed in U.S. Pat. Nos. 3,246,336; 2,707,151 and 4,012,535. Each of these patents relates to high molasses (or other sugar) content feeds or salt blocks, and makes use of a wet binder which is dried off after the feed formation process. The resultant pellets and blocks may be fed as manufactured, but are also commonly subjected to a crumbling step to produce a granular product useful for blended animal feeds. The term "high molasses content" generally refers to feeds with 30–80 percent molasses content, although such feeds more typically contain 50–60 percent molasses.

Compacted feeds may cause bloating in livestock. Pellets and chunks in the crumbled pellet or block material tend to swell as they pass through an animal's digestive system. Uncompacted feeds offer greater ease of digestion, but that advantage must be balanced against the expense of the special shipping, handling and storage requirements of loose feeds. It is also relatively inconvenient to ship loose feed for long distances. Specialized high sided trucks are used when moving loose feed locally.

Molasses-containing feeds offer the advantage of the minerals and nutrient content of the molasses, together with the disadvantage of the sugar content of the molasses. Certain significant markets tolerate no more than about eight percent sugar content. It is currently economically feasible to extract essentially all of the sugar content from molasses by-products. Sugar-extracted molasses is generally referred to as "concentrated separator by-product" or CSB. CSB provides the protein and trace minerals of molasses, and can be substituted for molasses as an additive to improve the handling properties of dried pulp.

In extracting sugar from a starting crop, such as sugar beets, the crop is first chopped or shredded and then pressed to remove all of the juice. The remaining pulp from this process dries into a fine-sized, lightweight flake or string, which is difficult to handle. Therefore, before drying, molasses or CSB is added back into the pulp. The dried pulp/additive mixture may contain up to 8 percent moisture. The dried pulp/additive mixture is then either shipped or stored as a loose shred, or it is formed into pellets, using a wet compaction method, prior to shipping or storing.

There is a need for more efficient and convenient packaging of fibrous pulp materials. There is further a need for an animal feed made from sugar beet by-products which avoids the disadvantages associated with currently available such feeds. Specifically, there remains a need for a sugar beet by-product animal feed containing little or no sugar which can be shipped in compacted form, stored without regard to the weather and fed in loose or shredded form.

SUMMARY OF THE INVENTION

The present invention provides a high density animal feed bale of low binding additive content and low or no sugar content. The bale contains an admixture of pulp and a binding additive. This admixture is compressed while dry to form a bale having a density of up to about 65, preferably above about 40, and typically within the range of about 50–60 lb/ft$^3$. Twine, or straps of either plastic or metal, may be used to secure the bale. Bales produced by the practice of this invention also facilitate the shipping, handling and storing of by-product pulps destined for other applications, such as for paper, cardboard, or pressed board manufacture.

The term "molasses" is used throughout this specification to include such sugar sources as corn steep liquor, black strap molasses, cane molasses, beet molasses, corn sugar molasses, citrus molasses, hydrol, and the like. The terms "additive," "handling additive" or "binding additive" include substances such as molasses, concentrated separator by-product (CSB), or a mixture of molasses and CSB. "CSB" includes an equivalent of a molasses from which most or all of the sugar content has been extracted, retaining a high level of protein and mineral content. Pulps treatable in accordance with this invention include, but are not limited to, sugar beet pulp, sugar beet seeds, grain mill screenings, sugar cane tops, bagasse, peanut hulls, cottonseed hulls, alfalfa, citrus pulp, ground corn cobs, soybean mill feed, wood shavings, saw dust, etc. Composition percentages are expressed in this specification on a dry weight basis.

The invention is particularly useful to the sugar industry. Pulp and molasses are both by-products of sugar production which must ordinarily be disposed of in some fashion. Sugar industry pulp, especially when mixed with molasses or other additives, provides an excellent feed source for animals. Accordingly, the bales of this invention solve a disposal problem while providing a desirable commercial product.

Bales of this invention may be formed in any size or shape convenient for a particular use, but they are preferably sized for ease in shipping and handling. Bales are easily shipped by standard carrier, avoiding the need for specialized conveyances. Shipping costs are also greatly reduced due to the improved density of the product. Bales of this invention are easily handled manually or by standard palleting equipment, and may be stored outdoors without protection.

Standard bale busters (primarily used for hay or alfalfa bales) or rotary tub grinders may be used at the feed or other usage point to reduce the feed bale to loose shred. A spray wash may be utilized during bale reduction, or a secondary washing step may be employed if necessary to remove additive prior to continued processing steps.

A high density bale of this invention includes dried fibrous pulp and an effective mount of dried additive. An amount of dried additive effective to produce bales which will hold their shape after formation is generally less than about 20 percent. Currently preferred feeds are limited to less than about 8 percent total sugar content. This restriction limits the mount of dried molasses additive in a bale to below about 10 percent. When CSB is substituted for molasses, bales with essentially no sugar and a high protein content may be formed from a dry admixture containing up to about 20 percent dried CSB. Blends of molasses and CSB may be formulated to adjust the sugar content of the binding additive. Other additives may be included to form a more complete feed, but their use is outside the scope of this disclosure.

The current invention provides bales of greater density than typical of pellets. A bale density of about 55-60 lb/ft$^3$ is currently preferred, although bales having densities as low as about 40 lb/ft$^3$ are commercially useful. Baling twine or straps tend to cut into bales having densities near 40 lb/ft$^3$, however. The highest densities obtainable are generally preferred to reduce shipping charges, particularly in the case of ocean going vessels which charge by volume. The amount of pulp contained in a typical bale of this invention may be nearly 50 percent more than in an equal volume of currently available pellets of the same material.

BRIEF DESCRIPTION OF THE DRAWINGS

In the drawings, which illustrate what is presently regarded as the best mode for carrying out the invention:

FIG. 1 is a side perspective view of a small pulp bale of this invention; and

FIG. 2 is a side perspective view of a large pulp bale of this invention.

DESCRIPTION OF THE ILLUSTRATED EMBODIMENTS

FIG. 1 illustrates a typical small bale 10 of this invention, measuring approximately: l=12"×w=13"×h=21$_1$". A bale this size of sugar beet pulp weighs approximately 100 lbs. Bales as small as 15 lbs are within contemplation. FIG. 2 illustrates a typical large bale 20, measuring approximately: l=31–48"×w=48"×h =48", which produces a bale of sugar beet pulp weighing approximately 2500 lbs. The 100 lb and 2500 lb bales are ideal from the standpoint of creating standard 2500 lb pallets or stacks. Twenty such pallets, weighing 25 tons in total, constitute a legal load for a common flat bed semi-trailer or van. A 25 ton load is also accommodated by conventional covered cars or flat cars for rail transport.

To form the bales, the sugar beet pulp is recovered, dried and mixed with approximately 15 percent CSB additive in conventional fashion. The dry admixture is pressed by a hydraulic ram utilizing appropriate dies to form bales of the dried pulp and additive mixture. After compaction, individual bales 10, 20 are secured by baling twine 30.

Bales may be formed as straight sided cubes or rectangular shapes (FIG. 1), or they may be customized for ease of handling. Forklift easements 40 may be pressed into, or otherwise formed in, the bottom surface 50 of a larger bale, thereby incorporating a pallet structure directly into the bale (FIG. 2). The edges 45 of the bale 20 may be chamfered to prevent baling twine or straps from cutting into the bale.

Reference in this disclosure to specific details of the illustrated or preferred embodiments is not intended to limit the scope of the appended claims, which themselves recite those features regarded as important to the invention.

What is claimed is:

1. A high density animal feed bale including:
   fibrous pulp; and
   an effective amount of additive, said pulp and additive being compressed in a dried state to a density of at least about 40 lb/ft$^3$.

2. A feed bale according to claim 1, wherein said fibrous pulp comprises shredded beet pulp.

3. A feed bale according to claim 1, wherein said additive comprises beet molasses or CSB.

4. A feed bale according to claim 3, wherein said fibrous pulp comprises shredded beet pulp.

5. A feed bale according to claim 1, wherein said bale is compressed to a density of up to about 65 lb/ft$^3$.

6. A feed bale according to claim 5, wherein said bale is compressed to a density of between about 50–60 lb/ft$^3$.

7. A feed bale according to claim 6, wherein said fibrous pulp comprises shredded beet pulp.

8. A feed bale according to claim 6, wherein said additive comprises beet molasses or CSB.

9. A feed bale according to claim 8, wherein said fibrous pulp comprises shredded beet pulp.

10. A pulp bale containing cellulosic fibrous material in admixture with binding additive, said bale being formed under compression forces while said pulp and additive are in a dried condition containing up to about 8 percent moisture, said bale having a density greater than about 40 lb/ft$^3$.

11. A bale according to claim 10, comprising up to about 20 percent of said additive.

12. A bale according to claim 11, wherein said bale comprises up to about 10 percent dried molasses.

13. A bale according to claim 10 compressed to a density of between about 50–60 lb/ft$^3$.

14. A bale according to claim 13, wherein said fibrous material comprises shredded beet pulp.

15. A bale according to claim 13, wherein said additive comprises beet molasses or CSB.

16. A feed bale according to claim 15, wherein said fibrous material comprises shredded beet pulp.

17. A high density animal feed bale including:
   an admixture of
      fibrous pulp; and
      an effective amount of dried additive, said dried additive contributing up to about 8 percent sugar content to said admixture; wherein
   said pulp and additive are compressed in a dried state to a density within the range of about 40–65 lb/ft$^3$.

18. A feed bale according to claim 17 wherein said pulp and said additive are derived from sugar beets.

19. A feed bale according to claim 17 comprising forklift easements pressed into a bottom surface of said bale.

* * * * *

UNITED STATES PATENT AND TRADEMARK OFFICE
CERTIFICATE OF CORRECTION

PATENT NO. : 5,665,417

DATED : September 9, 1997

INVENTOR(S) : Rogers et al.

It is certified that error appears in the above-identified patent and that said Letters Patent is hereby corrected as shown below:

In Column 1, line 16, change "tracks" to --trucks--;

In Column 1, line 27, change "tracks" to --trucks--;

In Column 3, line 8, change "mount" to --amount--;

In Column 3, line 13, change "mount" to --amount--;

In Column 3, line 47, change "h=21₁" to --h=21--.

Signed and Sealed this

Ninth Day of June, 1998

*Attest:*

BRUCE LEHMAN

*Attesting Officer*  *Commissioner of Patents and Trademarks*